United States Patent [19]

Catanese, Jr. et al.

[11] Patent Number: 5,422,808
[45] Date of Patent: Jun. 6, 1995

[54] METHOD AND APPARATUS FOR FAIL-SAFE CONTROL OF AT LEAST ONE ELECTRO-MECHANICAL OR ELECTRO-HYDRAULIC COMPONENT

[75] Inventors: Anthony T. Catanese, Jr., 724 First St., Mamaroneck, N.Y. 10543; Anthony DiMaggio, Lake Carmel, N.Y.

[73] Assignee: Anthony T. Catanese, Jr., Mamaroneck, N.Y.

[21] Appl. No.: 50,870

[22] Filed: Apr. 20, 1993

[51] Int. Cl.6 .............................................. G05B 9/02
[52] U.S. Cl. .................................... 364/184; 318/563; 318/671; 395/575; 60/399; 307/64; 307/66; 307/132 E; 307/132 T
[58] Field of Search ................ 364/505, 184; 318/563, 318/671; 60/399; 395/575; 307/64, 66, 132 E, 132 EA, 132 T; 361/67

[56] References Cited

U.S. PATENT DOCUMENTS

| | | | |
|---|---|---|---|
| 3,588,652 | 6/1971 | Lewis | 318/563 |
| 3,629,679 | 12/1971 | Halfhill | 318/563 |
| 4,005,581 | 2/1977 | Aanstad . | |
| 4,059,745 | 11/1977 | Gaertner . | |
| 4,074,354 | 2/1978 | Nakagawa et al. . | |
| 4,360,882 | 11/1982 | Stewart et al. . | |
| 4,376,450 | 3/1983 | Fayfield et al. | 318/563 |
| 4,521,847 | 6/1985 | Ziehm et al. . | |
| 4,729,089 | 3/1988 | Bench et al. . | |
| 4,902,947 | 2/1990 | Ako | 318/563 |
| 5,057,994 | 10/1991 | Spiller . | |
| 5,095,438 | 3/1992 | Sasaki . | |
| 5,111,383 | 5/1992 | Kimura et al. | 318/563 |
| 5,111,383 | 5/1992 | Kimura et al. . | |
| 5,170,109 | 12/1992 | Yauagita et al. | 318/563 |

*Primary Examiner*—Emanuel T. Voeltz
*Assistant Examiner*—Thomas Peeso
*Attorney, Agent, or Firm*—Lackenbach Siegel Marzullo Aronson & Greenspan

[57] ABSTRACT

A fault management apparatus and method are described for a system that includes at least one electro-mechanical or electro-hydraulic component, such as a system valve or main discharge pump in a process plant or water transmission line. An actuator is electrically coupled to the component for application of control signals to selectively actuate or de-actuate the component. A standby power supply, in the form of a uninterruptible power supply (UPS) stores sufficient electrical energy to energize the valve and/or the discharge pump to change the states thereof from one operational state to another. The UPS has sufficient electrical capacity to close a system valve to its fail-safe condition. The actuator can be actuated in a number of different ways, including sensing of failure of main power, manual activation or sensing of some emergency condition. Logic circuit, which may be in the form of relay or other logic, and preferably a programmable logic circuit (PLC) is used and programmed to sense the external conditions which require shutdown of the system, in which case the energy stored in the standby power supply is applied to the actuator and the component. The PLC is advantageously programmed to shutdown the system, when necessary, in accordance with a timed sequence, checking or monitoring a system at each step of the sequence as to the continued existence of the condition which required shutdown. Similarly, when the system is automatically returned on line, the PLC is advantageously programmed to check the system along each step of the sequence to insure that all of the conditions are acceptable for return of the system to the on-line condition.

20 Claims, 13 Drawing Sheets

METHOD AND APPARATUS FOR FAIL-SAFE CONTROL OF AT LEAST ONE ELECTRO-MECHANICAL OR ELECTRO-HYDRAULIC COMPONENT

BACKGROUND OF THE INVENTION

The present invention generally relates to control systems, and more specifically to a fault management method and apparatus for a system that includes at least one electromechanical or electro-hydraulic components. Applications of the apparatus include fail-safe actuators for controlling closure speeds and torques applied to system valves to minimize hydraulic shock waves or valve damage due to runaway kinetic energy.

In many industrial applications where hazardous or large quantities of fluid are handled, it is important that the facility be constantly monitored and shut down in the case of an emergency to avoid potential injury to personnel or damage to the facility. One condition that is typically monitored is the main power. Additionally, sensors may be used to detect emergency conditions, such as escaping fluid, fire, etc. In each case, it is important to have a scheme for shutting down the industrial plant or facility and, equally important, for re-instating the operation of the facility after the emergency condition has been eliminated or power restored.

Numerous controllers and actuators have been devised for dealing with the problem of shut down. While many supervisory control systems are known, the known systems for actuating an electro-mechanical or electro-hydraulic component, such as a pump discharge valve, are reactionary in nature. Thus, there is virtually no time lapse between a fail-safe signal and valve closure. Such reactionary devices have two major disadvantages. Firstly, being primarily mechanical or hydraulic in nature, such actuators are normally not capable of stopping once initiated and, once initiated, dispense all of their energy within a very short period of time. Subsequently, these devices must be reset and this may take seine time and effort. The primary disadvantage, however, of using such reactionary devices is that once initiated, they act almost instantaneously and can induce hydraulic shock waves in the system being controlled and damage valves or other system components.

There are also known numerous programmable controller devices in supervisory control systems which provide supervisory control in a sequential or selective manner and that provide a time responsive control. In some instances, the programmable logic circuits (PLCs) are designed specifically for providing protection of reliability features including backup or standby. However, in most instances, the backup or standby controllers merely include auxiliary power for operating the controller itself. In most controllers, in which power supplies are used, such supplies are normally themselves disabled in the event of a power failure. Thus, in most of such systems, the backup power supply is merely intended to provide sufficient power to continue operation of the controller circuits and not designed or adapted to provide sufficient power to a controlled element, such as a valve or the like.

In U.S. Pat. No. 5,095,438, an engine controller is disclosed which is connected to an automobile battery. In this patent, it appears that the battery is merely used as a backup power source for maintaining distort memory and RAM and possibly other logic circuits.

Numerous uses of programmable controllers have been proposed in conjunction with process plants that are intended to monitor control parameters and maintain a process by regulating various controlled elements. Thus, in U.S. Pat. No. 4,005,581, an apparatus is disclosed for controlling a steam turbine which includes a controller. In U.S. Pat. No. 4,059,745, a system is disclosed for regulating a process with a single final control element, such as a valve to insure that process variables do not exceed the acceptable minimum or maximum limits. U.S. Pat. No. 4,074,354 illustrates the use of a digitally controlled apparatus for regulating a valve on the basis of sensing signals received from field sensing devices. The system provides a centralized maintenance backup system for supplying backup control signals to selected field control devices while their normal control signals are interrupted while servicing various system components. In U.S. Pat. No. 4,360,882, there is disclosed a control system in which a controller is used to prevent a stuck valve from being overdriven by a controller.

It is also known to control turn off or job recovery after a malfunction has been detected. Thus, in U.S. Pat. No. 4,521,847, a control system is disclosed for job recovery after a malfunction. Such control systems are also used in a field of sequential control for safety of numerically controlled machine tools, such as disclosed in U.S. Pat. No. 5,111,383. Microprocessor control is disclosed in U.S. Pat. No. 4,729,089, in which the controller insures proper sequencing in a heat pumped air-conditioning system. Microprocessor control is used to prevent transient noise from resetting the microprocessor and restarting the system.

In U.S. Pat. No. 5,057,994, a controlled system for an industrial plant is disclosed in which a controller is utilized to receive the outputs of numerous sensors to detect parameters of the industrial plant. The controller is provided with fault logic for providing shut down mechanisms for the industrial plant. The prior art does not, however, include intelligent fail-safe devices for electro-mechanical or electro-hydraulic components that do not rely on reactionary devices, such as spring, pneumatic or hydraulically driven devices that may cause damage to both the components which are being controlled as well as the system in which they are incorporated.

SUMMARY OF THE INVENTION

Accordingly, it is an object of the present invention to provide a fail-safe fault management apparatus that is suitable for use with electro-mechanical or electro-hydraulic components.

It is another object of the present invention to provide a fault management apparatus which is simple in construction and economical to manufacture.

It is still another object of the present invention to provide a fault management apparatus that can be used in process plants, such as for injecting and mixing fluids.

It is yet another object of the present invention to provide a fault management apparatus that provides fail-safe operation without relying on mechanical or hydraulic reactionary devices.

It is a further object of the present invention to provide a fault management apparatus that permits valves to be closed at their own normal closing speeds, without inducement of hydraulic shock waves or damage the valves or associated components due to runaway kinetic energy as has been the case with spring, pneumatic or hydraulically driven fail-safe devices.

It is still a further object of the present invention to provide a fault management apparatus of the type above suggested that can incorporate actuators for valves or the like to be controlled or can be used as conversion devices for adapting existing actuators to convert these to fail-safe devices.

It is yet a further object of the present invention to provide a fault management apparatus that can be adapted and programmed to customize its operation for a specific process facility and to accommodate the system components.

It is an additional object of the present invention to provide a fault management apparatus as suggested in the previous objects that allows for a quick and easy adjustment to provide delays in the actuation of the components being controlled to avoid inadvertent actuation as a result of transient conditions, such as very short duration power failures.

It is still an additional object of the present invention to provide a method for fault management of the system along the lines above suggested.

In order to achieve the above objects, as well as others which will become apparent hereafter, a fault management apparatus for a system that includes at least one electromechanical or electro-hydraulic component having two operational states to be controlled as a function of at least one external condition, comprises actuator means coupled to the component to be controlled for application of control signals to selectively actuate or deactuate the component. Standby electrical power supply means is provided for storing sufficient electrical energy to energize the component to change the state of the component from one operational state to the other operational state. Sensing means is provided for detecting the presence or absence of at least one external condition. Logic means is provided which is responsive to said sensing means for applying energy stored in said standby electrical power supply means to said actuator means and the component. In this manner, the state of the component can be changed from one state to the other upon the occurrence of at least one external condition.

A method in accordance with the present invention for managing fault in a system and includes at least one electro-mechanical or electro-hydraulic component having two operational states to be controlled as a function of at least one external condition comprises the steps of storing sufficient electrical energy to energize the component to change the state of the component from one operational state to the other operational state. The presence or absence of at least one external condition is detected. The stored energies applied to the component to change its state upon the occurrence of said at least one external condition.

BRIEF DESCRIPTION OF THE DRAWINGS

The present invention will be more fully described by way of example, with reference to the accompanying drawings, in which.

DESCRIPTION OF THE PREFERRED EMBODIMENTS

Figure 1:
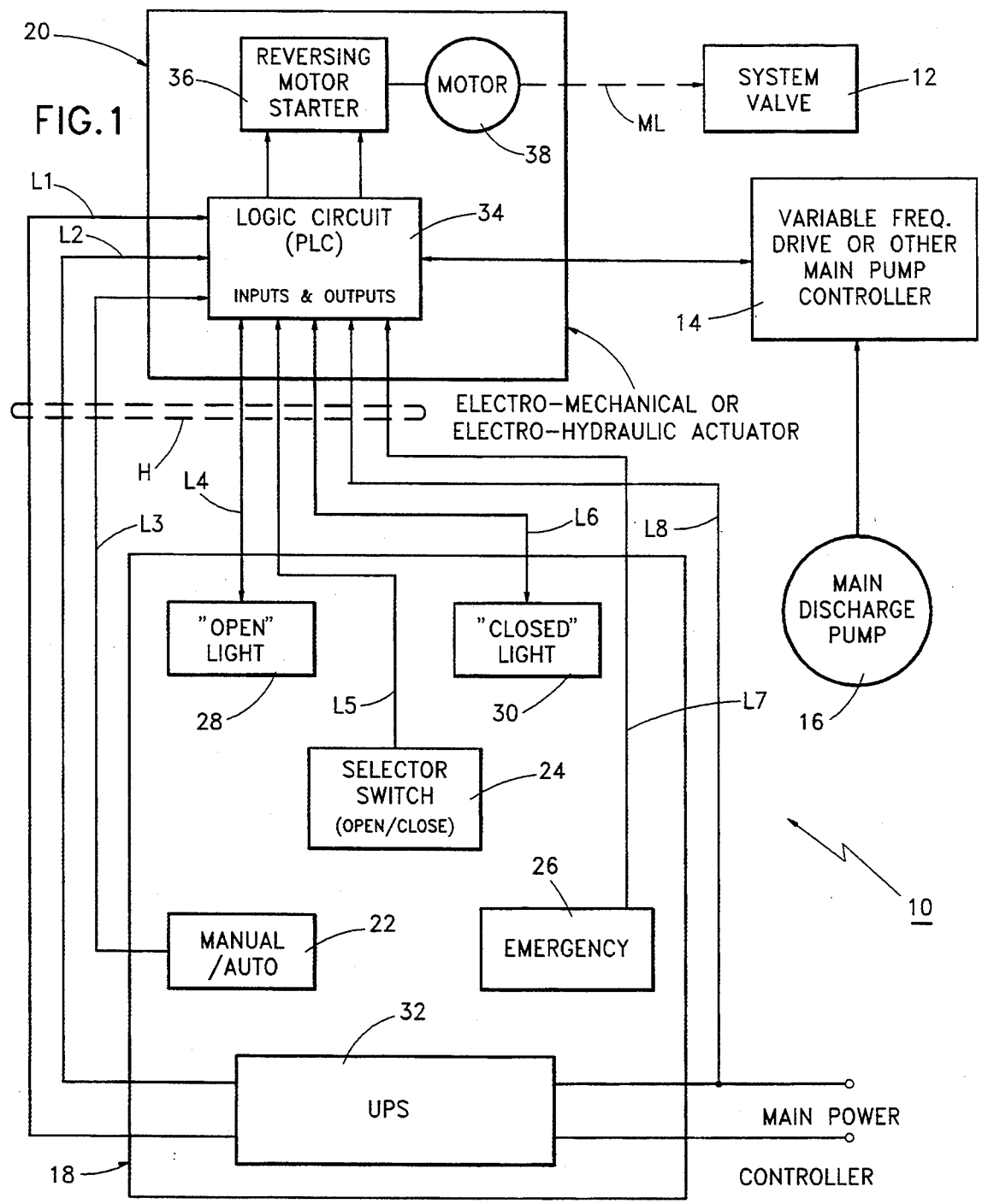
FIG. 1 is a block diagram of an apparatus in accordance with the present invention, in particular setting for controlling a system valve and main discharge pump.

Referring now specifically to the figures, in which identical or similar parts are designated by the same reference numerals throughout, and first referring to FIG. 1, a fault management or fail-safe apparatus in accordance with the present invention is generally designated by the reference numeral 10.

The apparatus 10 is intended to be used with a system or facility that includes at least one electro-mechanical or electro-hydraulic component that has two operational states to be controlled as a function of at least one external condition. In FIG. 1, such a system or facility is shown to include a system valve 12 as well as a variable frequency drive or other main pump controller 14 which controls a main discharge pump 16. In most instances, the system valve, discharge pump and its controller are part of an existing facility and may either be non-fail-safe, partially fail-safe or fail-safe.

In accordance with the present invention, the apparatus 10 normally includes a controller 18 which is electrically connected to an actuator 20. The controller 18 typically includes a number of switches, including a manual/automatic switch 22 for selecting the mode of operation of the controller. In the manual mode, the opening or closing of the system valve 12 and/or the main discharge pump 16 is performed manually. In the automatic mode, the operation is delegated to the actuator, as will be described more specifically hereinafter. The controller 18 also includes a selector switch 24 that enables an attendant to open or close the system valve 12 manually. The reference numeral 26 represents a sensor for monitoring an emergency condition, such as fire, excessive water released, or other external condition which requires the system valve 12 and/or the discharge pump 16 to be changed from one operational state to another, such as the opening or the closing of the system valve 12 and/or the turning off the discharge pump 16. One or more emergency sensors 26 may be used, as will be evident from the description that follows. The controller also typically includes an "open" light 28 and a "closed" light 30 for providing a visual indication of the condition of the component being controlled, in this case the system valve 12.

An important feature of the present invention is the use of a standby electrical power supply 32 for storing sufficient electrical energy to energize the component being controlled in order to change the state of that component from one operational state to the other, upon command. In the presently preferred embodiments, such standby electrical power supply is in the nature of an uninterruptible power supply (UPS) selected to have a sufficiently high energy storing capacity to actuate or energize the components, such as the system valve 12, notwithstanding the possible failure of the main power to the system. Any suitable standby electrical power supply may be used for the purpose, considering the energy required to move the system component between different operational states. Such backup UPS supplies are available, for example, from American Power Conversion of West Kingston, R.I. which accept a nominal input voltage of 120 VAC, single phase, and provide an output of 115 VAC. The available units range from a maximum capacity of 250,170 watts to 1,250,900 watts, and are capable of providing a surge energy rating of 240 J and a peak current capability of 6,500 amps. Such UPS units can typically recharge to approximately 90% capacity after discharging into a 50% load of between 5 and 10 hours. As will become evident, the UPS 32 in the embodiments of the present invention substantially replace the prior art fail-safe devices that are spring, pneumatic or hydraulically driven to operate the existing fail-safe valves of the type used in industrial applications.

The actuator 20 serves as an interface between the controller 18 and the components being controlled. The actuator 20 includes a logic circuit 34 that interfaces with at least some of the components in the controller 18 and for interpreting the status of those components to control the operation of a reversing motor starter 36 which controls motor 38 that is mechanically linked to the system valve 12. In its broadest sense, the logic circuit 34 may be in a form of any circuit logic and may be hard wired logic, such as relay or diode logic, or may be in the form of a programmable logic circuit (PLC) is programmed to recognize the various conditions established by the controller 18 and interpret those conditions to initiate the operation of the system valve 12 and main discharge pump 16.

The controller 14 may also be a variable frequency drive (VFD) commonly used with discharge pumps.

The specific nature of the logic circuit 34 is normally a function of the complexity of the system being controlled and the complexity of the programmed sequence(s) that are to be initiated upon the occurrence of various system conditions. As will be described in connection with FIG. 2, the logic circuit 34 may be extremely simple for a simple application. However, for more complicated system arrangements, described in connection with FIGS. 4–13, the logic circuit 34 is preferably in the nature of a microprocessor-based controller that is microprogrammable. The specific microprogrammable controller used is not critical for purposes of the present invention. However, by way of example only, such a programmable controller sold by Idec Corporation of Sunnyvale, Calif. as "Micro-1" has been found to be suitable for the purposes of the present invention. The aforementioned controller is provided with a keyboard program loader that facilitates the programming of the controller. The unit has up to 16 inputs and 12 outputs and has a program capacity of 600 steps (words), and 80 timers. Examples of how these features of the controller can be applied to specific applications will be described below. Programming can be done using familiar relay symbol format. Applications software "Latter Input Program" is available for programming on an IBM or compatible personal computers in connection with well-known programming techniques.

The controller 18 is shown connected to the actuator 20 by means of leads or conductors L1–L8 which may be contained within a wire harness H, so that the controller 18 and the actuator 20 may be spaced remotely from each other in an actual system configuration. The actuator 20 is generally situated at the location of the system valve 12 and/or the discharge pump 16.

It will be noted that one of the leads L8 that provides an input to the logic circuit 34 is a conductor connected to one of the input power lines in order to monitor the main power. Thus, the main power feeds the UPS 32 and, under normal operation, charges the UPS and maintains it at peak capacity. During such normal operation, the logic circuit 34 serves a signal by means of lead L8 that the main power is available. However, during failure of main power, the logic circuit 34 is given a signal indicating that there has been a failure of main power and fail-safe control is provided as will be described.

Figure 2:
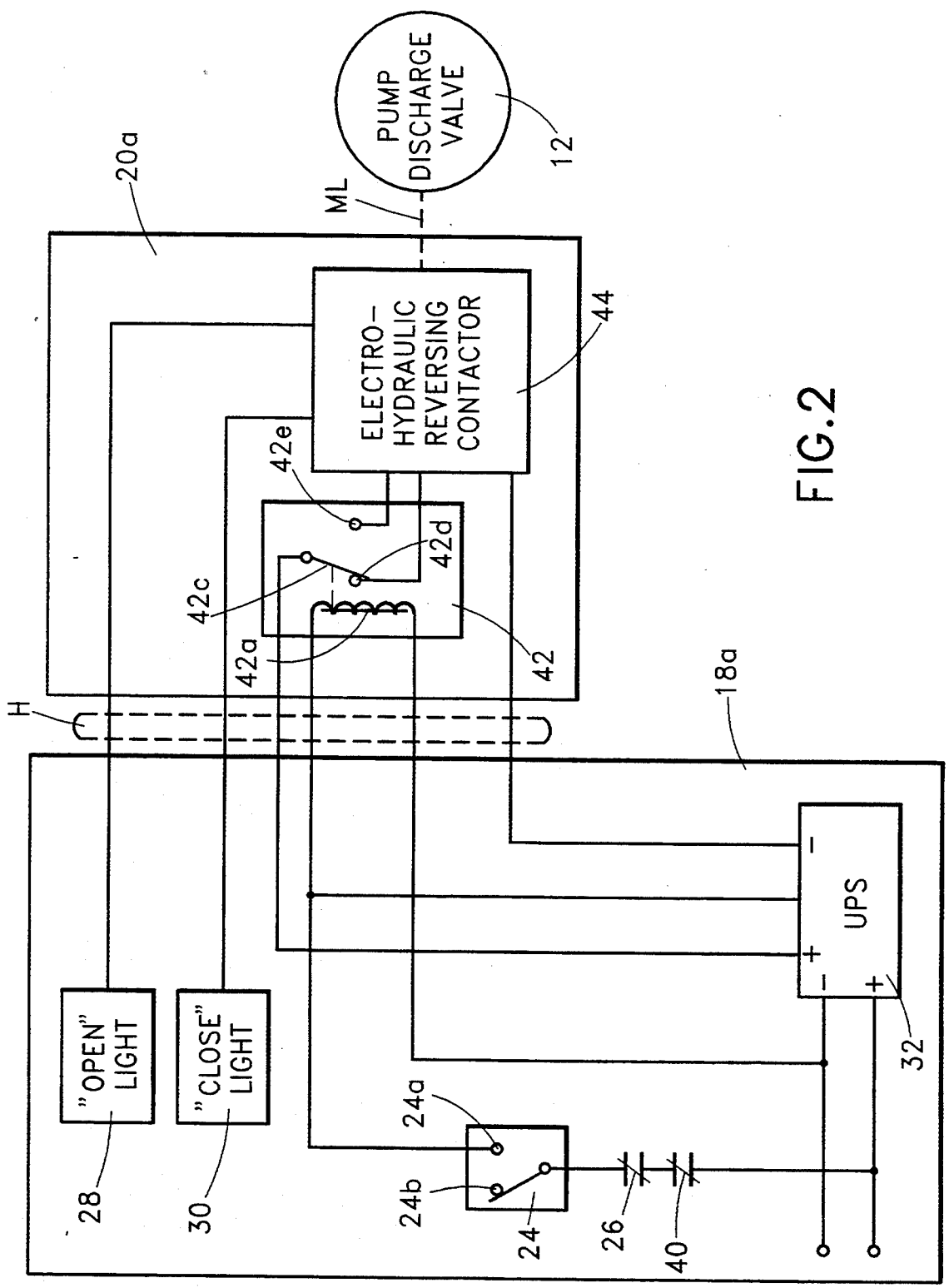
FIG. 2 is a schematic diagram of a basic application of the apparatus of claim 1 which includes an electro-hydraulic actuator for controlling a pump discharge valve.

Referring to FIG. 2, a simple fail-safe control circuit is disclosed that incorporates the principles of the present invention, and yet is extremely simple and inexpensive. As with the general arrangement shown in FIG. 1, the embodiment 10a includes a controller 18a which is connected by means of a harness H to a electro-hydraulic actuator 20a. In this embodiment, a minimal number of control wiring is required between the main control panel or controller 18a and the actuator 20a, only one 6-wire conductor need be used in place of the 16–24 conductors typically required with other fail-safe actuators.

The controller 18a is shown with the selector switch 24 connected in series with emergency sensor 26 and an emergency stop switch 40. The emergency sensor switches and the emergency stop switch are normally closed and connected in series with each other, as shown, and with the selector switch 24. When the selector switch is in the "open" command position 24a (switch contacts closed), one side of the main power lines is connected to one side of a coil 42a of a relay 42, the other side of the coil being connected to the other conductor of the main power lines. Under normal conditions, therefore, when the selector switch 24 is in the "open" position, the relay is energized and movable contact 42c of the relay is moved to contact 42d to open an electro-hydraulic reversing contactor 44, which opens the discharge valve 12 through a mechanical link or coupling ML. However, when there is a failure in the main power or if the emergency stop switch 40 is manually opened or an emergency sensor detects an emergency and opens the switch 26, or the selector switch 24 is moved to the "close" command contact 24b (switch contacts open), it is clear that power will be removed from the relay coil 42a and it will become de-energized, thereby moving the contact 42c to the contact 42e of the relay 42, thereby causing the reversing contactor 44 to move to the "close" position, and thereby causing the discharge valve 12 to close by means of the mechanical link ML. Even with all of the series switches 40, 26 and 24 in the closed positions, should there be a failure of power at the input to the UPS 32, it should be clear that the relay 42 will likewise become de-energized, moving the reversing contactor 44 to the close position, energy for this purpose having been stored energy within the UPS 32. Thus, it should be clear that the relay 42 serves as a logic element that controls the actuator as a function of the electrical voltages applied thereto. The actuator 20a shown in FIG. 2 is an example of relay logic used to provide intelligence to the system. As suggested previously, however, different forms of circuit logic may be utilized although, as to be described, the preferred logic is provided by programmable micro-controllers.

Figure 3:
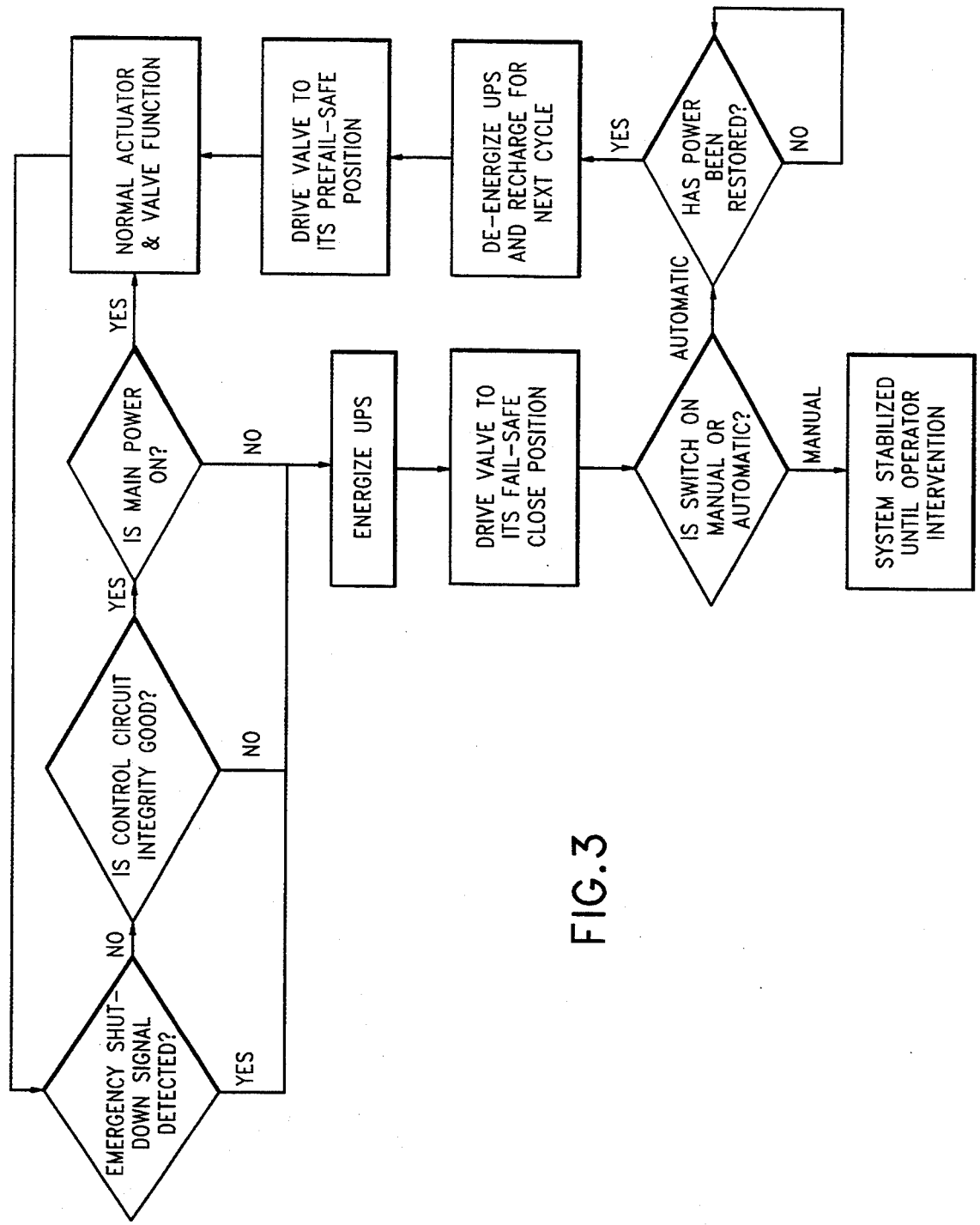
FIG. 3 is a functional flow chart which describes the operation of the apparatus shown in FIG. 2.

Referring to FIG. 3, the functional flow chart indicates that the operation of the arrangement is relatively simple. If all of the following are detected, normal actuator and valve function will be permitted to continue: absence of emergency shutdown signal, control circuit integrity is good (relay 42 is energized) and the main power is on. If either an emergency shutdown signal is detected, or there is a main power failure or the relay is otherwise de-energized, the UPS 32 is energized to drive the valve 12 to its fail-safe closed position. When an optional manual or automatic switch is provided, the status of that switch is checked to see if it is in the manual or the automatic position. When in the manual position, the system is maintained in its fail-safe position until there is operator intervention. However, when the switch is in the automatic position, the system continuously monitors the main power lines to see if main power has been restored. When such power is restored, the UPS 32 is de-energized and recharges for the next cycle, at which time the drive valve is returned to its pre-fail-safe position to revert the system to its normal actuator and valve function.

Because of the minimal amount of wiring between the controller 18a and the electrohydraulic actuator 20a, this very simple and inexpensive arrangement shown in FIG. 2 is particularly suitable for use as totally submersible valve actuators. Such units are capable of up to 80,000 inch pounds of torque at the outside 90° on rotary units. This equates to the closing of a 42 inch plug valve in approximately 45 seconds. The system may consist of a one-third horsepower 115 volt motor to drive a 3,000 psi hydraulic pump, which feeds a hydraulic cylinder to open or close the valve. While extremely simple and inexpensive, the control system continuously monitors main power, control integrity and emergency status. Any of these, plus a host of other optional inputs, will automatically trigger the units fail-safe response. However, because of its simplicity, the apparatus or device 10a is a reactionary device, there being no time lapse between a fail-safe signal and valve closure. However, unlike prior art, other fail-safe devices that are spring, pneumatic or hydraulically driven, the arrangement shown in FIG. 10a allows fail-safe valves to be opened and closed at their own normal speeds and maximum torque. By controlling closure speed and torque, no inducement of hydraulic shock waves or valve damage due to runaway kinetic energy occurs. Instead, there is a steady control closure, at the valve's normal rate and thrust. Also, since all controls are enclosed within the actuator housing, only one selector switch and two position lights 28,30 are needed on the control console or controller panel 18a per valve. The apparatus 10a can find numerous applications, including in refineries, waster water treatment, chemical process applications, and anywhere else where a low-cost simple fail-safe device is required. The system will adapt to any manufacture's gate, globe, butterfly, ball, cone, check or plug valve. Again, because of its simplicity and low cost, the device shown in FIG. 2 can be custom configured to different specific applications, as will be readily evident to those skilled in the art.

Figure 4:
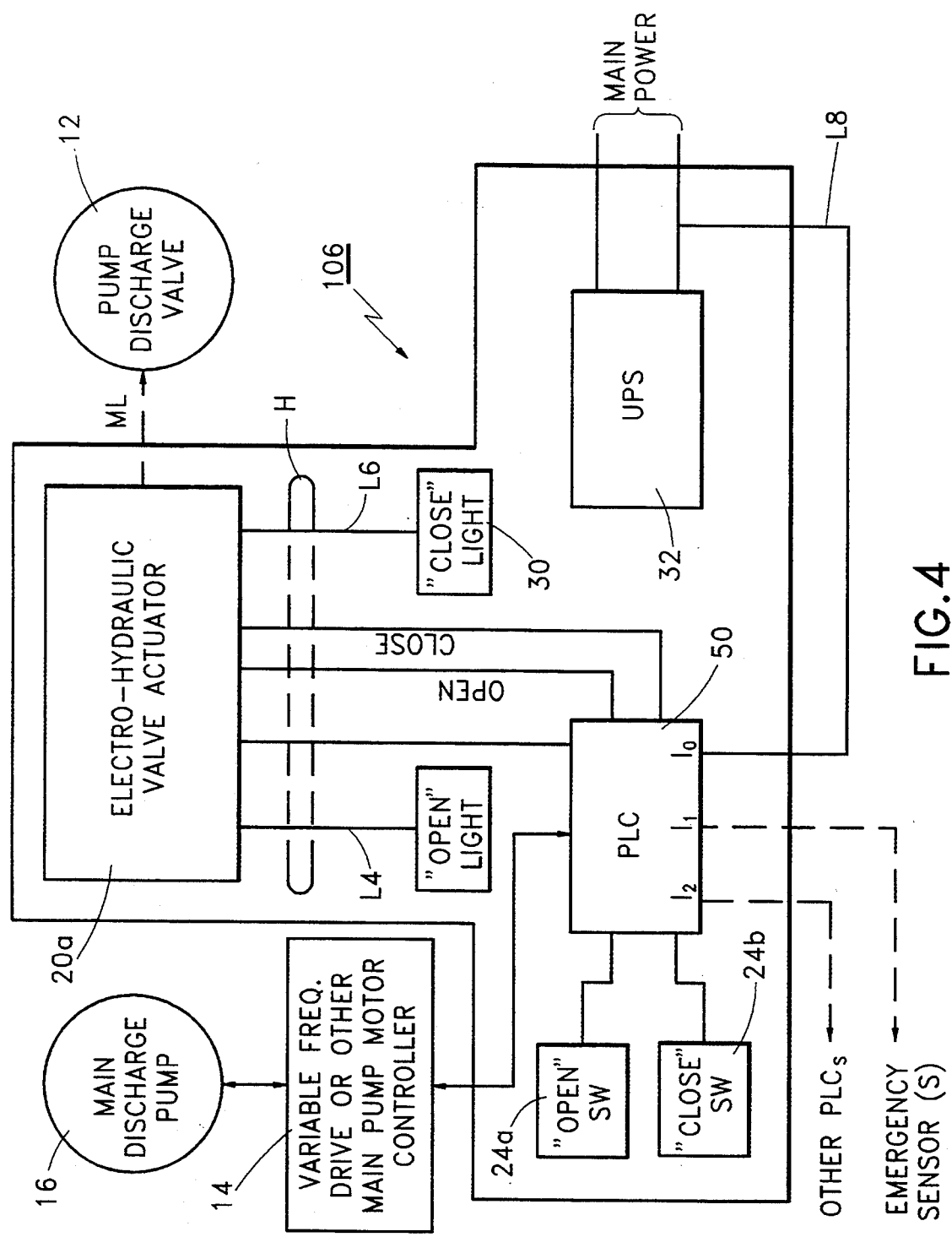
FIG. 4 is a block diagram of another embodiment of the present invention, showing another application which includes an electro-hydraulic valve actuator for controlling a pump discharge valve, which includes a programmable logic controller (PLC)

Referring to FIG. 4, a fail-safe logic actuator and motor starter is generally designated by the reference numeral 10b. The illustrated actuator 10b is designed primarily for the potable water transmission industry, wherein a sequence of motor-start and motor-stop fail-safe timing is critical to eliminate hydraulic shock waves.

The actuator 10b is shown to include the equivalent of the controller and actuator shown in FIG. 1, and can include a low horsepower 115 volt motor that can feed a hydraulic cylinder to open or close the discharge vane 12. Also as in FIG. 1, the actuator 20a includes a programmable logic controller (PLC), and the UPS is used to provide logic control and fail-safe energy. The PLC and motor controller may be enclosed in a common actuator housing.

In addition to receiving an input $I_o$ representing the presence of main power, the PLC 50, as suggested, is not only connected to one or more emergency sensors as previously described, but the PLC may be connected (at $I_2$) to other PLCs that may be in proximity to or be remote from each other. For example, in a pumping station for potable water transmission system, in which three pumps are used, three similar hydraulic drive actuators 10b may be used, one in connected with each of the discharge pumps. In this way, if an emergency condition is sensed by one of the PLCs, suitable signals can be transmitted to the other PLCs at the station and even at remote stations so that the pump discharge valves may be controlled along the entire potable water transmission line in a controlled manner so as to avoid hydraulic shockwaves commonly generated by power loss. As in the previous embodiments, the valve actuator 20a may be spaced remotely from the associated controller panel which includes the PLC and associated components by means of a harness H which, as indicated, needs as few as five conductors.

The operation of the device 10b will now be described. When the "open" selector is actuated, the following sequence occurs. The PLC first generates a pump start signal motor, pump 16 to start, activating the motor starter or pump controller 14. When the pump motor is up to speed (usually in 3 to 5 seconds), the logic circuit in the PLC drives the actuator to open the discharge vane at a prescribed rate. This sequence eliminates the possibility of trying to start a motor against a reverse load and producing a mechanical shockwave on the motor shaft and pump. When the "close" selector is activated, the PLC first shuts down the discharge valve at a prescribed rate. When the valve is fully closed, the PLC shuts down the motor starter. This sequence eliminates the possible hydraulic shockwave formed by pump shut-down on an open manifold.

In response to an emergency or power loss, the actuator 20a can be programmed to operate swiftly and decisively. At all times, the device proofs the line to eliminate transients. Upon true power loss, the pump shut down immediately. The UPS is put on line and drives the actuator closed. The field adjustable closure rate can be timed precisely for 5 seconds to 30 minutes with the Micro-1 programmable controller. By controlling the fail-safe closure rate the massive hydraulic shockwave typically generated by instantaneously shutting down all of the discharge pumps can be dissipated throughout the system. Normally, 8 to 10 cycles of wave dissipation are needed before total closure is attempted. Using a PLC for the control of this closure rate guarantees 100% reliability of this critical timing sequence. Closure is repeatable at the same rate every time.

When power is restored, the device 10b proofs the voltage for reverse transients. If the power is present, it automatically starts the normal operation sequence as it recharges and resets for the next emergency.

Because the PLC actuator, motor starter and other associated control devices may be fully integrated in a single housing, as shown, the unit may be submersible below sea level and made explosion-proof. The device has the advantage of having 100% repeatability of closure rate which is not as achievable by other current methods. Additionally, the cost of the device is substantially less than comparable devices which have only some of the desired features of the invention. Thus, the physical wiring between actuator, local controller and control station is cut to one-third since all actuator controls are inside of the actuator itself. As indicated, only six wires are needed: two for power, two for open/close signal, and two for open/close indicators. This saves a great deal on installation costs since most standard fail-safe units require 18-24 conductors.

There are many electro-hydraulic actuators in the industry, as suggested above. However, all use pneumatics, springs or hydraulic accumulators for fail-safe capability. However, they are all reactionary devices. None use a PLC for system logic and a UPS for fail-safe energy.

By utilizing a programmable PLC, a significant advantage is achieved over existing approaches. In the existing schemes, it is difficult to slow down the fail-safe closure rates of current systems. All present methods use a flow metering device that limits pressure and volume through the system. As the ambient temperature changes and the system pressure decreases, the flow rates change through their metering valves. Current systems can only provide approximate closure rates and cannot be dependent upon to deliver the same closure rate every time.

Figure 5:
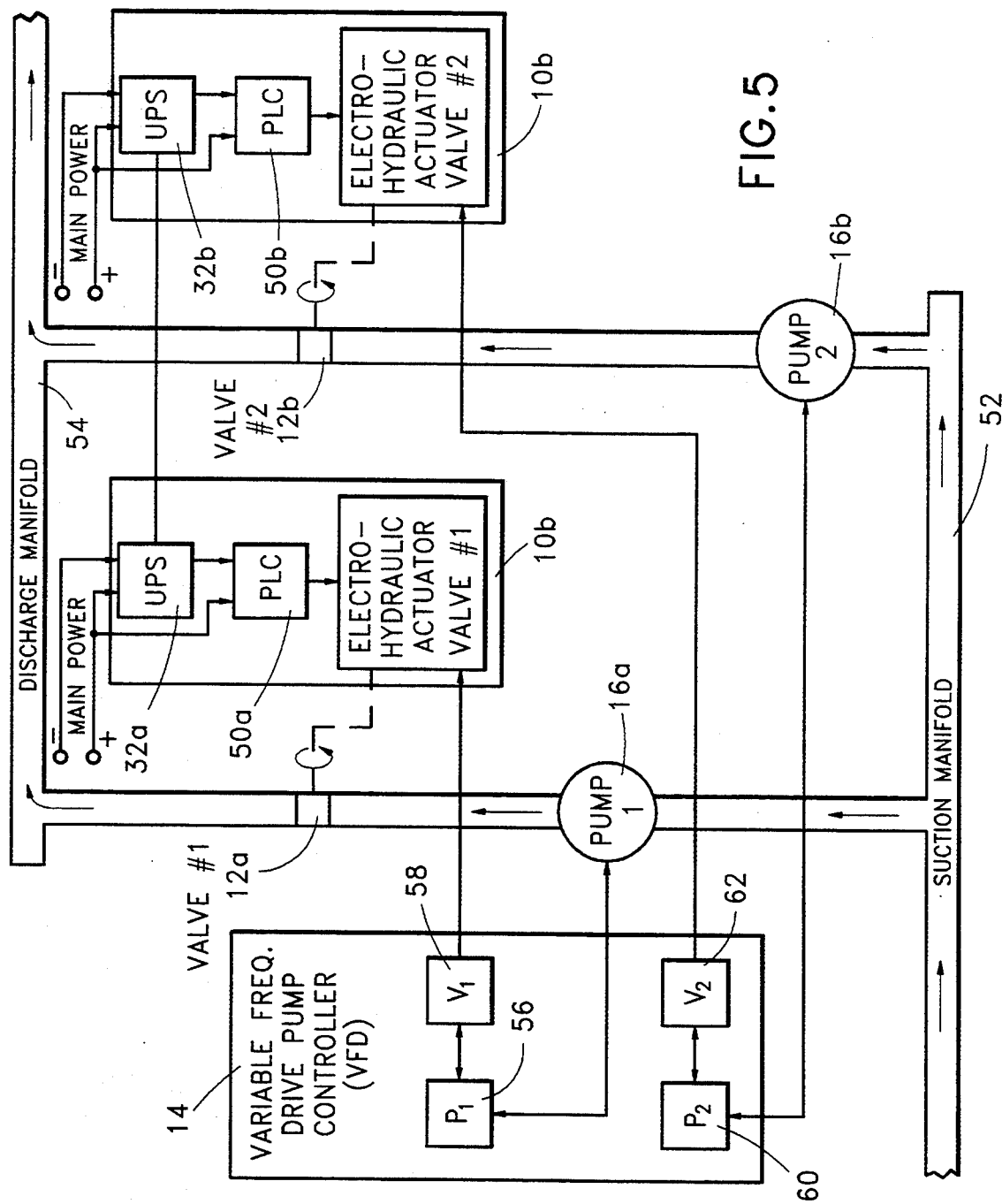
FIG. 5 is a diagrammatic representation of a typical water transmission pumping station which employs the fail-safe actuators shown in FIG. 4 for each pump in the pumping station.
Figure 6:
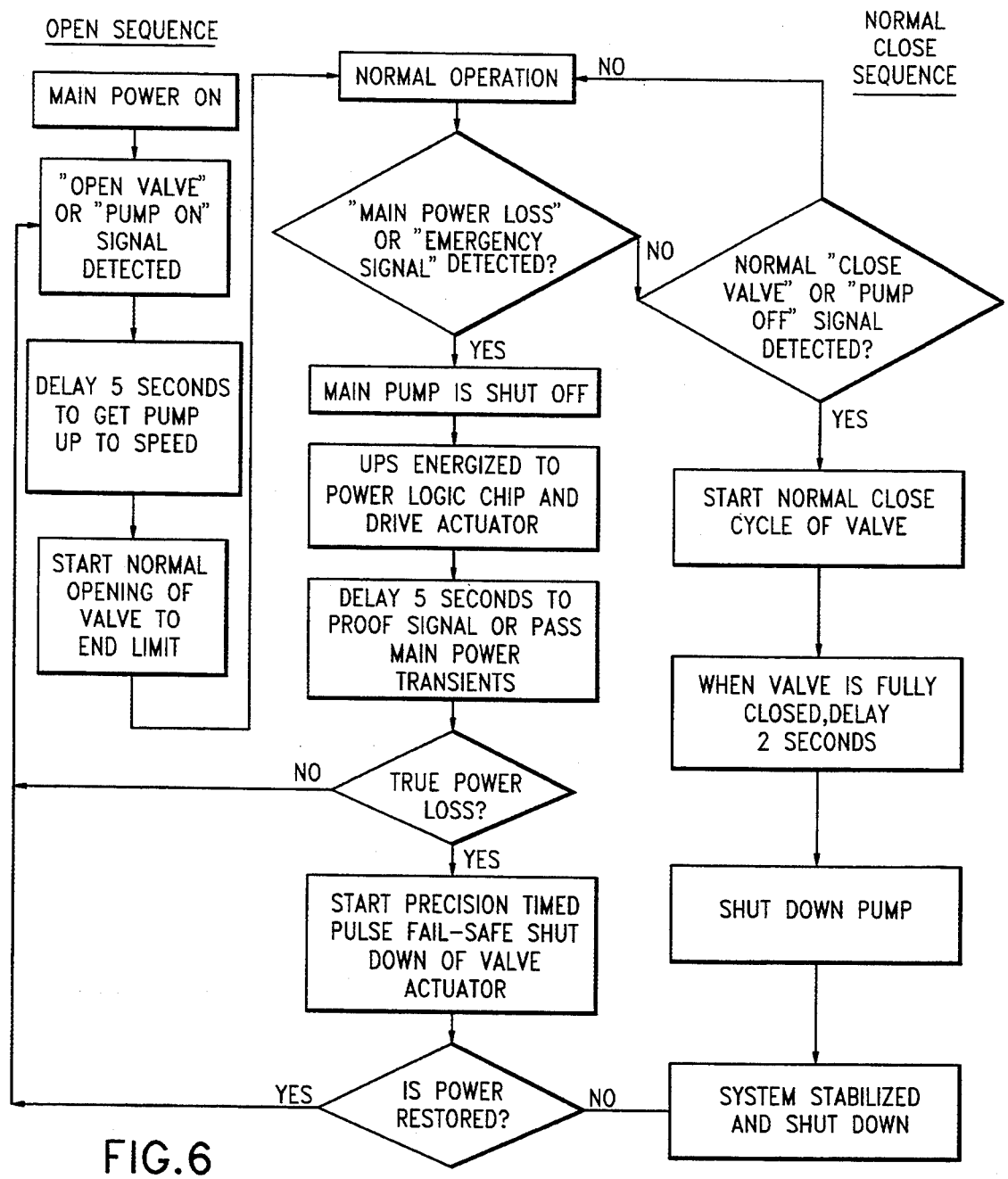
FIG. 6 is a functional flow chart illustrating the open and normal closing sequences for operation of the apparatus shown in FIG. 4.

In FIG. 5, a typical water transmission application is illustrated which represents two pumps at a pumping station along a water transmission line. The transmission line includes a suction manifold 52 and a discharge manifold 54 between which there are illustrated two pumps 16a and 16b for pumping potable water from the suction to the discharge manifolds. It will be clear to those skilled in the art, however, that such a pumping station may include one, three or any number of pumps and this will vary from system to system. Each pump will have associated therewith a fail-safe valve actuator and controller 10b of the type described in connection with FIG. 4.

The variable frequency drive pump controller (VFD) 14 includes a mechanical motor starter P and a logic motor controller V (which can also be a PLC) for each pump. Thus, the pump 1 is connected to a mechanical motor starter $P_1$ which communicates with the motor logic controller $V_1$ which, in turn, communicates with the electro-hydraulic valve actuator 1. Similarly, the pump 2 has associated therewith mechanical motor starter $P_2$ and logic motor controller $V_2$. A typical application may utilize, for example, 300 horsepower 24 inch centrifical pumps and 24 inch metal seated ball valves 12a and 12b. The electrohydraulic actuator valves may include fractional horsepower motors, such as one-third horsepower 115 volt motors, to drive 3,000 psi hydraulic pumps, which feed a hydraulic cylinder to open or close the valves 12a, 12b. The PLC also controls the main pump motor starter to fully integrate the discharge valve and pump into one complete system. The control sequence is designed to execute a logical series of events, as will now be described in connection with FIG. 6.

The open and normal close sequences for the actuator and controller shown in FIGS. 4 and 5 are illustrated for a specific application. Thus, the open sequence commences with main power on. If the PLC detects that the "open" switch 24a has been depressed or a "pump off" switch (not shown) has been depressed, the PLC is programmed to time a five second period after which the PLC energizes the actuator to bring the pump up to speed. Subsequently, the valve is opened in accordance with its normal opening sequence until the open end limit is detected. The PLC now regards the system as being normally operational. This condition of the pump and valve will continue until either a main power loss or emergency signal is detected, or the PLC detects a "close valve" or "pump off" signal which is manually inputted. Where shutdown results from a loss of main power or from the existence of an emergency signal, the main pump is turned off, after which the UPS is energized to power the logic circuit drive actuator. Again, there is a five second delay to verify or prove whether the emergency signal or pass main power transients. After the five second delay, if the PLC verifies that there has been no true power loss, the PLC sequences the pump and valve in the same way as when the main power is initially turned on. However, if a true power loss has been detected, the PLC commences a precision timed pulse fail-safe shutdown of the valve actuator. Again, if power is restored at any time, the PLC again proceeds through the open sequence in the same way as when power is initially turned on. However, if power is not restored, the system is stabilized and shutdown.

Similarly, if the abnormal condition results from manual instruction to "close the valve" or "turn the pump off", the PLC creates the commands to begin the normal close cycle of the valve. Once a valve is fully closed, the PLC times a two second delay, after which the pump is shutdown and the system stabilized.

It is noted that the PLC generates a five second delay when first sensing a main power loss. This delay is intended to verify true power loss. However, the PLC is programmed to delay for two seconds after the valve is fully closed before shutting down the pump. Here, the two second delay is selected to optimize the dissipation of the kinetic energies and avoid hydraulic shock. When proceeding through its normal close sequence, there is no proofing or verifying that the valve is fully closed. Clearly, the PLC recognizes that the valve is fully closed and the two second delay is, as indicated, intended to optimize the closing parameters of the valve and to maximize dissipation of energy in the line.

Figure 7:
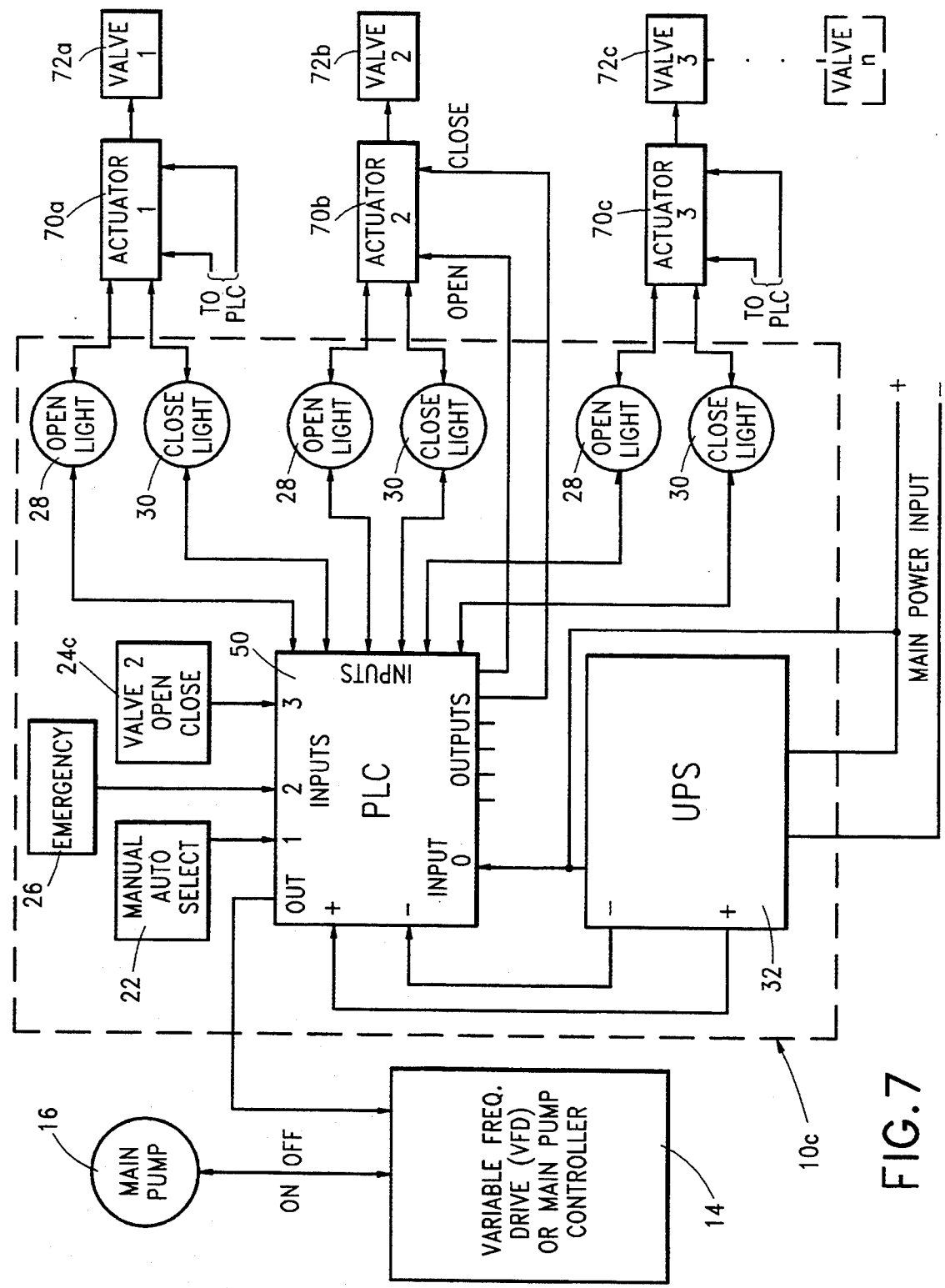
FIG. 7 is a block diagram of an apparatus in accordance with the present invention used for converting a plurality of non-fail-safe actuators to fail-safe actuators by the use of a single programmable logic circuit (PLC)

While the units 10a and 10b in FIGS. 2 and 4, respectively, advantageously include built-in electrohydraulic components to actuate the valves, the controller 10c shown in FIG. 7 can be used to convert existing non-fail-safe electro-hydraulic actuators to fail-safe actuators. Thus, the fail-safe device 10c includes a single PLC 50 which is connected to the input devices previously discussed, namely manual/auto select switch 22, a valve-specific open/close switch or control 24c and emergency sensor switch 26. Only one open and close control or switch 24c is shown for valve 2. However, it will be understood that an open/close switch of the same type shown is provided in connection with each of the valves 1, 2, 3, . . . v to be controlled. In the embodiment shown, three such valves 72a–72c are to be controlled.

Being primarily intended to be a conversion device, the unit 10c is connected to existing actuators 70a–70c, each associated with another of the valves. In order to convert non-fail-safe actuators to fail-safe ones, it will be clear that each of the actuators 70a–70c must be provided with some electrical interface which is normally used for actuating and decontrolling the actuator. Such existing actuators, associated with each of the valves, may include or be connected to intelligent actuators or may simply include manual switches to open and close the valve. However, whatever electrical interface that is provided, the unit 10c can be connected to that actuator in order to provide the operation to be described. The open and close lights 28, 30 may either be associated with the original actuators or may be added when interfacing with the actuators as shown. In other respects, the unit 10c is similar to the ones previously described and the operation is substantially similar.

The unit shown in FIG. 7 is, therefore, a fail-safe device integrating programmable logic circuitry with a standard actuator controller. The PLC is capable of simultaneously monitoring main electric power, pump controls and a wide variety of other inputs of these field adjustable inputs. If any are out of normal operating parameters, the unit can automatically react by closing valves, turning off pumps and processes, starting automatic fire sprinklers, and/or notifying a remote location by audio signal or computer interface. All of these tasks are accomplished without any external power but only the power supplied by the UPS.

Additionally, the unit 10c is a standard valve actuator controller that can control and interface with any type of electric, electro-hydraulic, pneumatic or centralized actuator system. The unit instantly converts any of these actuators to a fail-safe design. It senses main power transients, surges, and momentary outages under five seconds and reacts accordingly, in a systematic, controlled fashion. Thus, the unit is a completely automatic fail-safe device that will automatically close any valve actuator using its own stored power.

As such, the unit 10c protects fluid process systems in the event of a power interruption or failure. The device constantly monitors pump and control system voltages and conditions. Power outages under five seconds (transients) which are monitored by the unit logic will not cause the fail-safe closing of the valves and pumps. However, power outages over an adjustable time period (usually five to ten seconds) signals the logic circuit to automatically fail-safe the valve actuator. The unit automatically drives the valve actuator to its normal operating position. The logic circuit and internal power supply can reset and begin to recharge for the next cycle. This sequence is automatic and requires no operator response.

Figure 8:
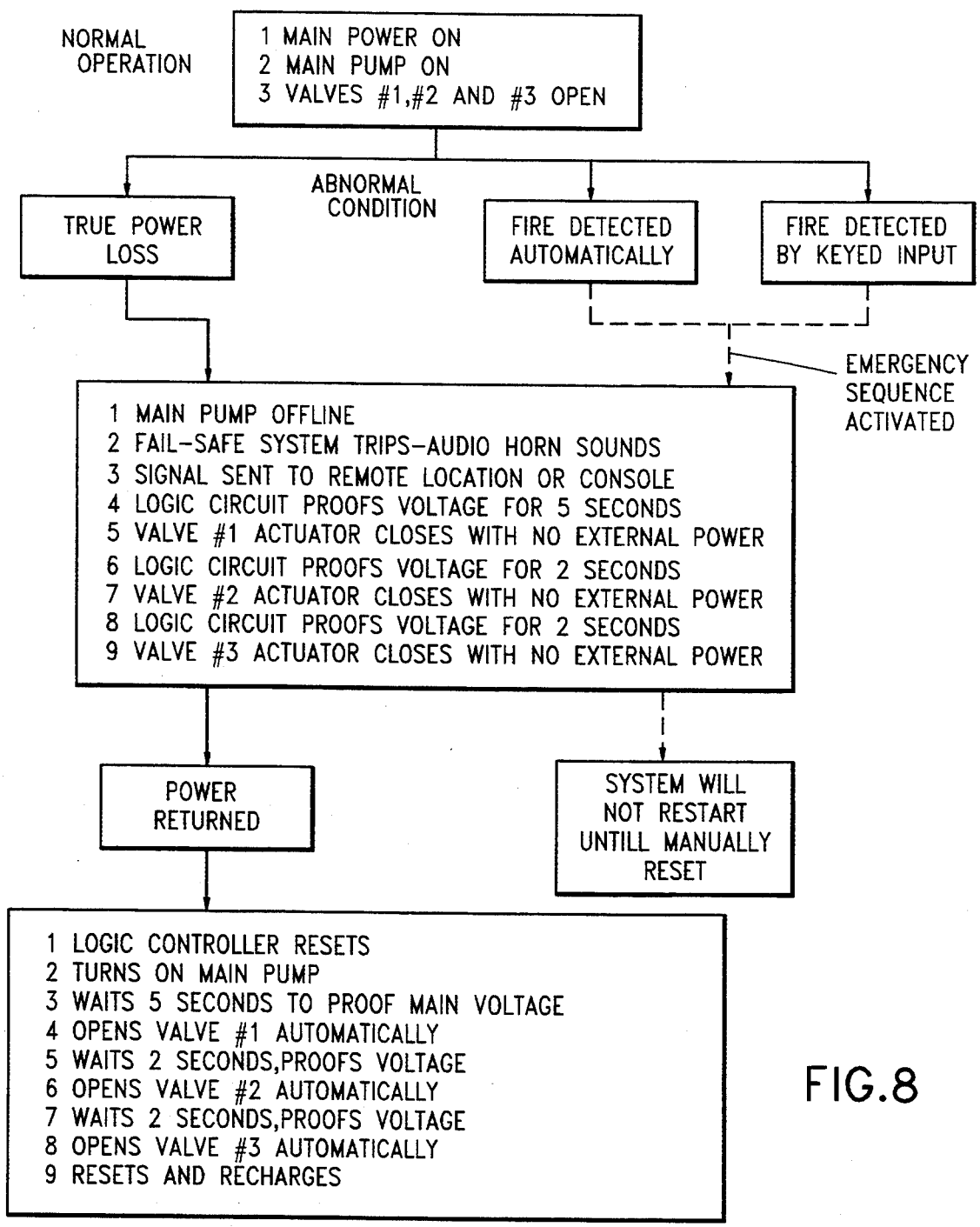
FIG. 8 is a flow chart showing the control sequences in the arrangement shown in FIG. 7.
Figure 9:
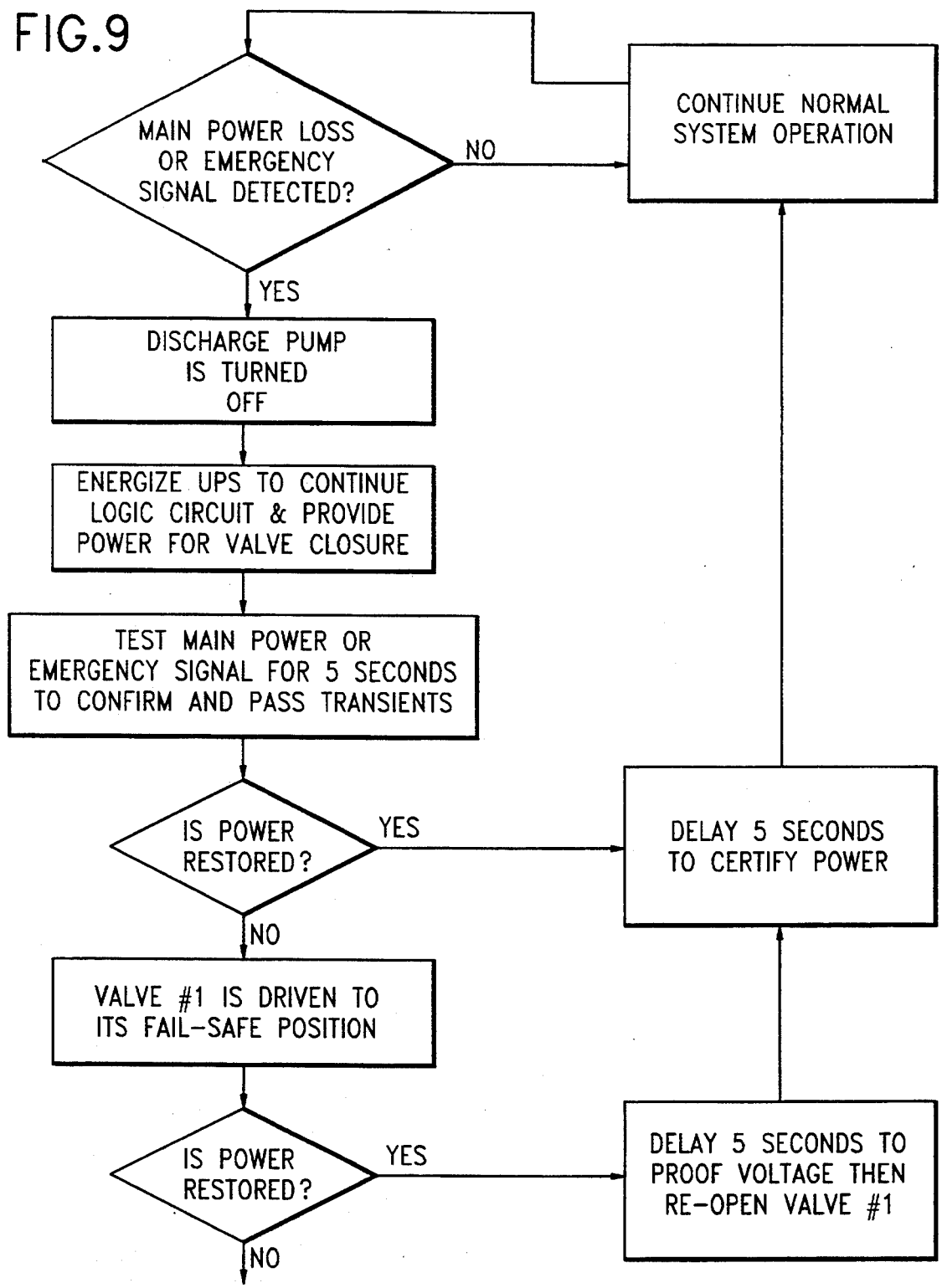
FIGS. 9-11 are functional flow charts illustrating power loss or emergency condition fail-safe shut down sequences for the arrangement shown in FIG. 7.
Figure 10:
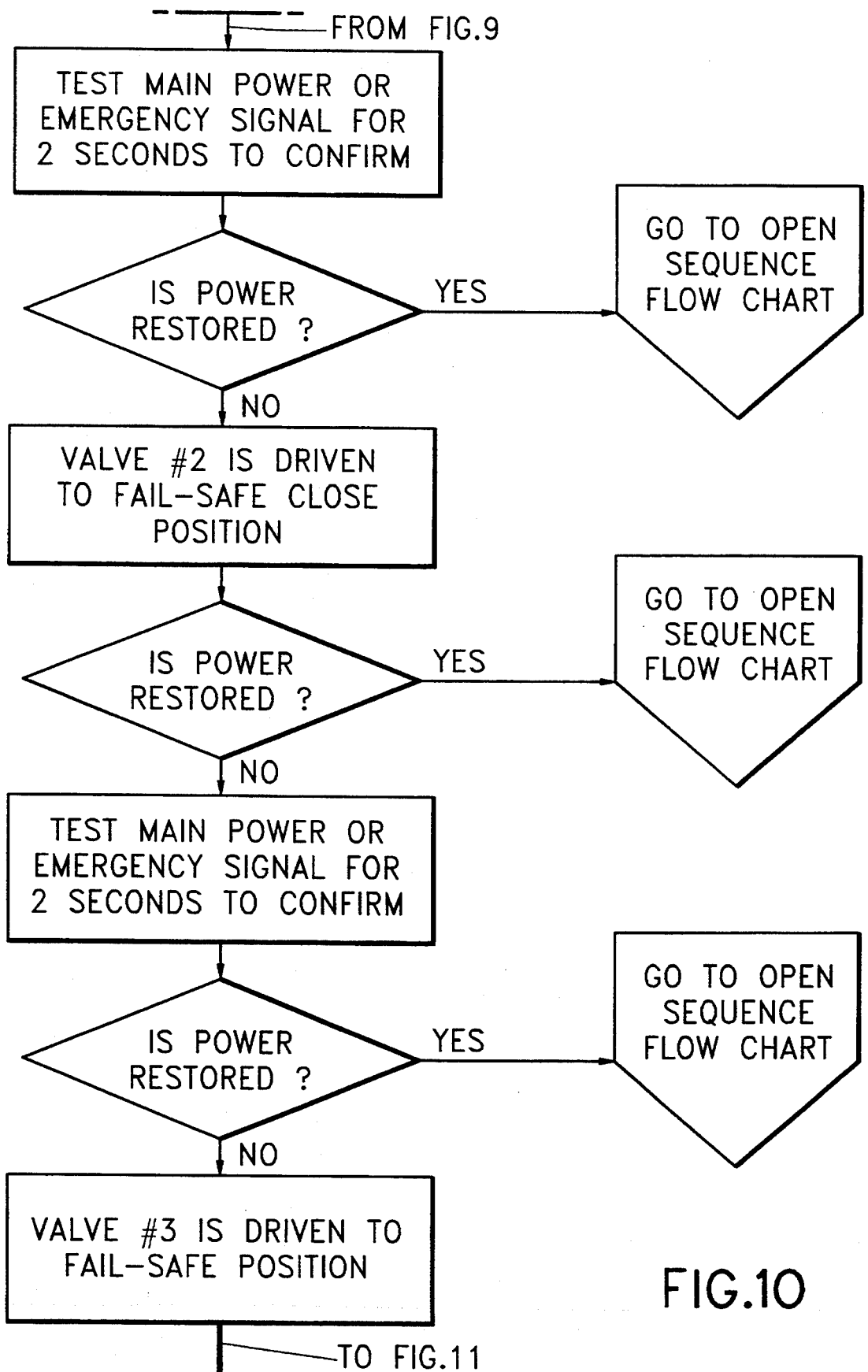
Figure 11:
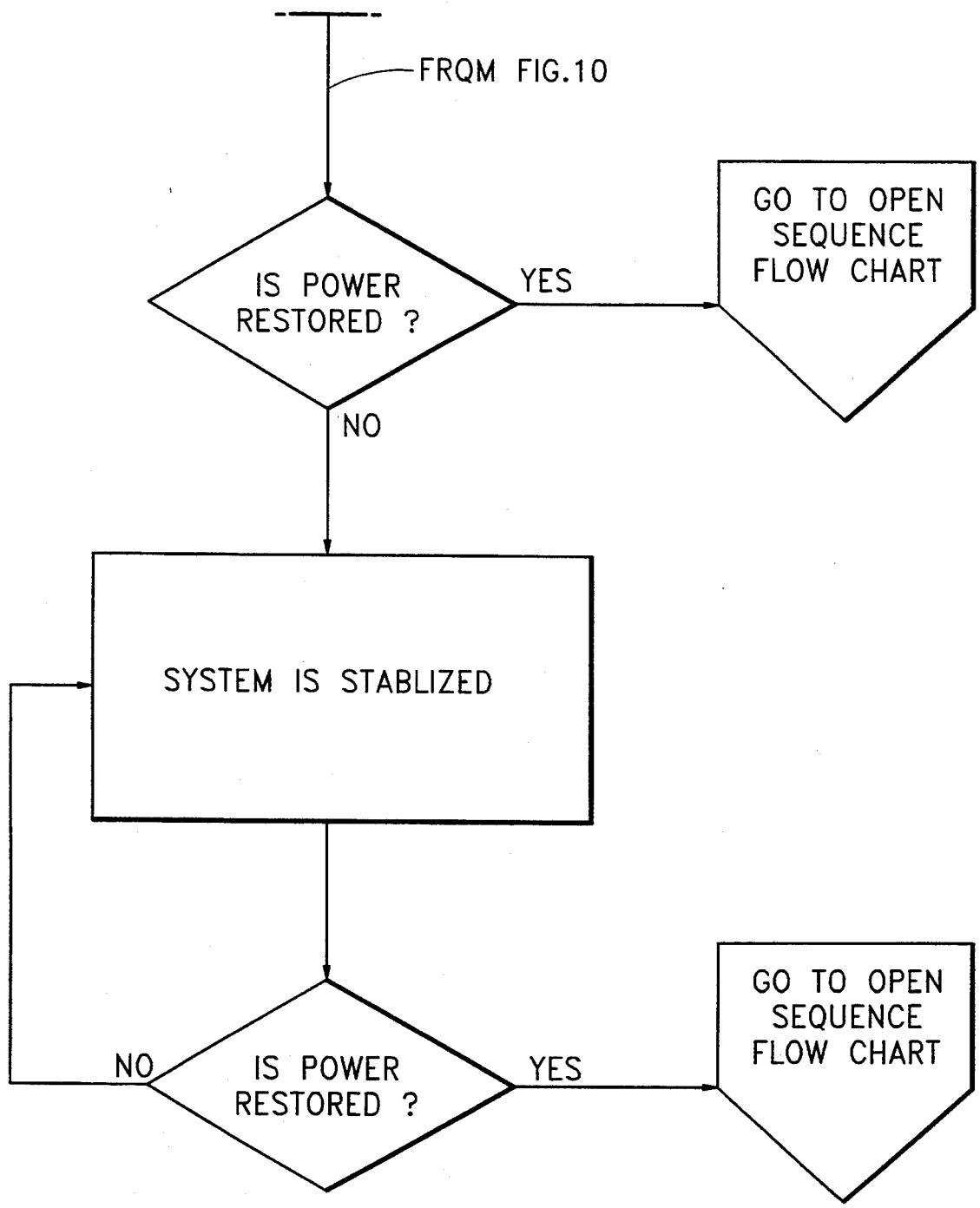

Before considering the more detailed sequence flow charts, it is pointed out that the unit 10c constantly monitors powers main power for voltage and operating conditions. Brown-outs under 100 volts will trip the logic circuit (PLC) to bring the UPS on line and return normal 115 volts to the system. Transient outages under five seconds will bring the UPS on line, but will not trip the fail-safe system. Power loss with more than five seconds will set off the following fail-safe sequence:

Referring to FIG. 8, the logic controller will first stop the main pump 16. It will delay five seconds and proof or verify the loss of main power or presence of an emergency signal. Valve 1 will then be driven to its fail-safe position. After valve 1 is closed, the unit will wait two seconds. It will verify the main power or signal, then drive valve 2 to its fail-safe position. Similarly, after valve 2 is closed, the unit will wait another two seconds. It will proof the main power, and subsequently drive valve 3 to its fail-safe position. As indicated, these time delays can be readily adjustable on the PLC.

If the manual/auto switch is in the manual position, when power is restored, nothing will happen. This will require an operator to physically control the valve actuators at the control station. In the automatic position, the unit will first turn on the pump, then test the return voltage to five seconds. If power continues to be present, it will then signal valve number 1 to go the position it was in, before power failure.

The logic circuit will wait two seconds, proof the voltage, and then return valve number 2 to its pre-power-loss position. The logic circuit will again wait two seconds, proof the voltage and then return valve number 3 to its pre-power-loss position.

An emergency button 26 is incorporated into the logic system. From any remote location, the emergency stop selection can be activated. This will automatically stop the main pump, and then fail-safe the three valves in sequence. During this time, it can sound an audio alarm and notify a remote station or computer of the emergency condition and fail-safe shutdown. The system will not recycle until the emergency condition is repaired and the switches reset.

Referring to FIGS. 9–13, the fail-safe shutdown and open sequences are illustrated in flowcharts representing the logic within the PLC. For normal operation, the main power is on and the main pump is on, as also indicated in FIG. 8. Valves 1, 2, and 3 are all open.

Upon power loss, the main discharge pump is turned off. The fail-safe system trips, and an optional sound generating device, such as an audio horn, sounds. Once the discharge pump is turned off, the UPS is energized to continue logic circuit operation and provide power for valve closure. The PLC tests the main power or emergency signal for five seconds to confirm and pass transients. If power is restored, a five second delay is initiated to certify power. If power is not restored, however, valve number 1 is driven to its fail-safe position, without external power, but only on the basis of power which has been stored within the UPS 32. The logic circuit again proofs for power and, if restored, a five second delay is again initiated to proof the voltage for reopening of valve 1. However, if power is still not restored after valve actuator 1 closes and such absence of power is verified, valve actuator 2 is driven to its fail-safe closed position. As before, the logic circuit proofs for a return of power and, if power is not yet restored after a predetermined delay, two seconds in the example, valve number 3 is driven to its fail-safe position. If more than three vanes are provided, it should be clear, this sequence is repeated until all the valves have been moved to their fail-safe positions. If, at any time during this sequence of the closing of all of the valves power is restored, the PLC proceeds to the "open" sequence which will be described in connection with FIGS. 12 and 13. After all of the valves have been closed and if power is still not restored, the system is stabilized and continues to remain in its fail-safe condition until power is restored, at which time the "open" sequence is initiated if the select switch 22 has been set to the "auto" mode. If in the "manual" mode, the system will remain in its closed or shutdown condition until manually reactivated by an operator.

As is clear from FIG. 8, the shutdown sequence can be initiated if the PLC detects a true power loss or when an emergency sequence is activated as a result of sensors which detect external conditions that demand shutdown. The sensors which activate such emergency sequence can take anyone of a wide variety of forms, including detectors for detecting smoke, water level, gas, etc. Process computers may also provide the necessary input signals to the PLC.

When an emergency signal is detected, as opposed to a true power loss, the unit generally follows the same shutdown procedure, except that the PLC can be programmed to establish different delays for proofing purposes. Thus, while five second delays may be used to proof a power loss, two second delays may be used to proof for emergency conditions. The PLC is preferably programmed so that after emergency activation, the system will not restart until manually reset, independently of the setting of the manual/auto select switch 22.

Figure 12:
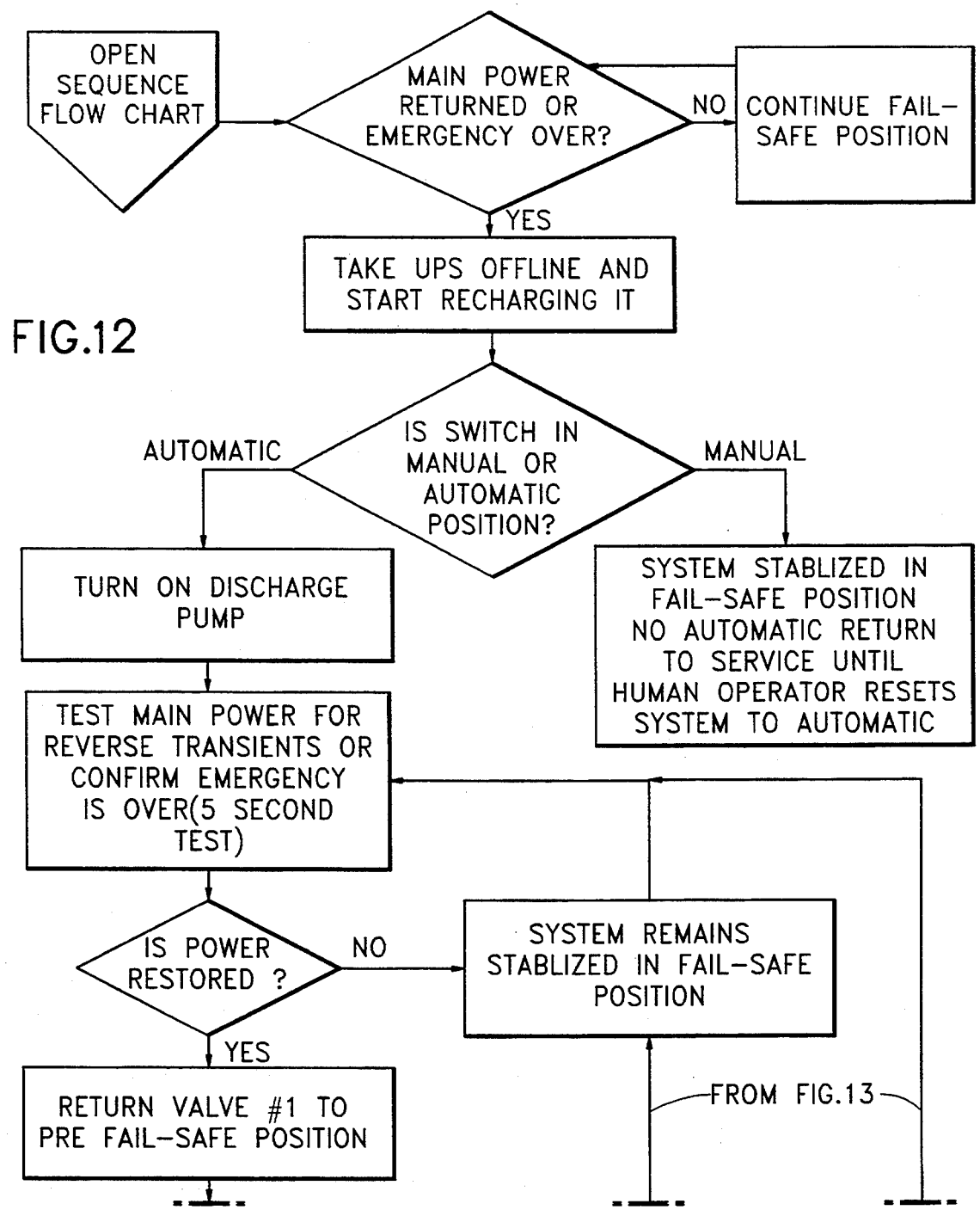
FIGS. 12 and 13 are functional flow charts illustrating the power return or emergency condition over open sequences for the arrangement shown in FIG. 7.
Figure 13:
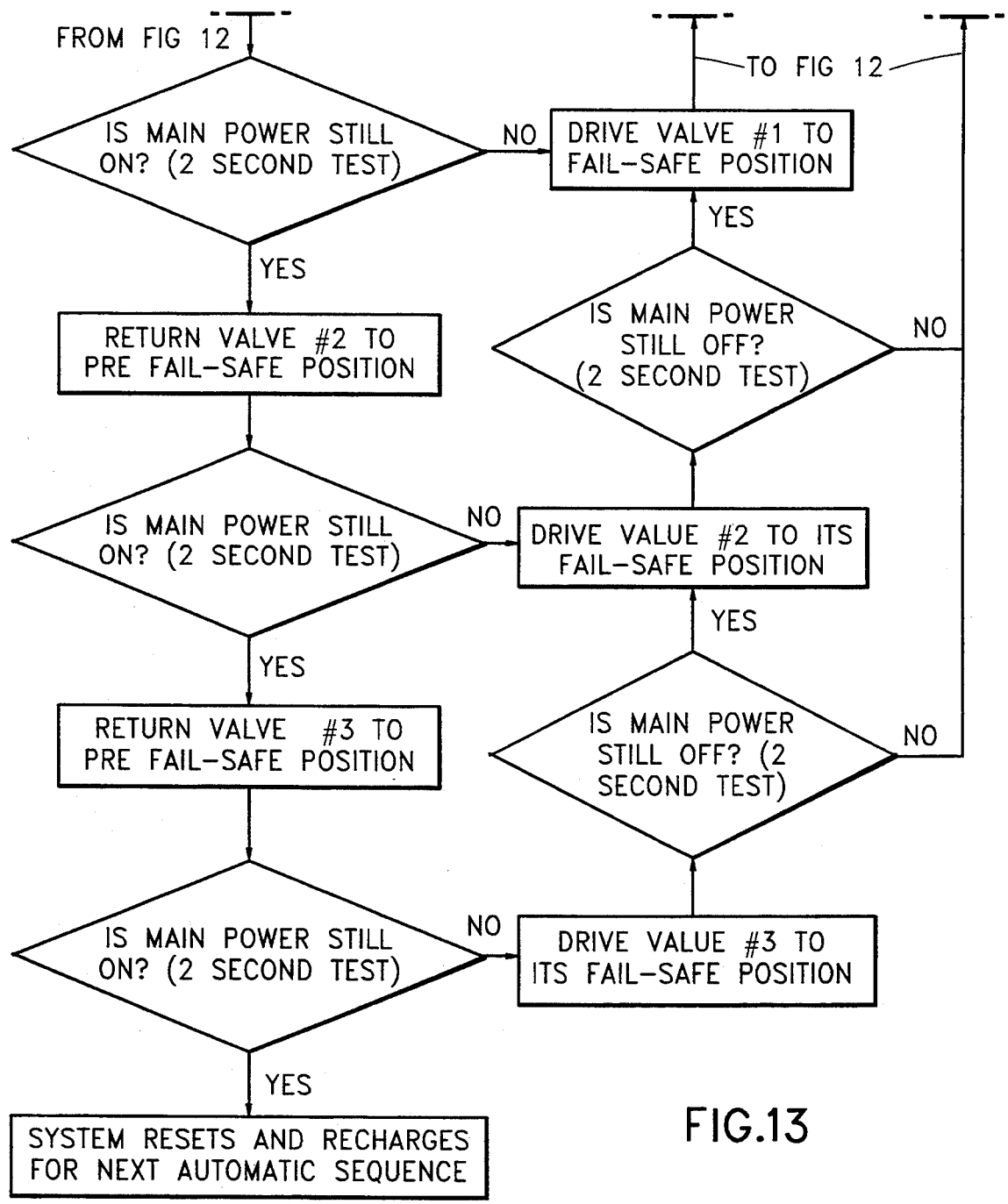

In FIGS. 12 and 13, the open sequence is indicated, such as after power is returned or emergency over condition is detected. When power is returned, the UPS is taken off line and starts to be recharged. If the select switch 22 is in the automatic mode, the PLC will turn on the main discharge pump. After a five second delay to proof the main voltage, to check for reverse transients or confirm emergency is over, the PLC returns valve number 1 to the pre-fail-safe position. The main power is then again proofed during a two second delay. If power is indicated, the valve number 2 is returned to its pre-fail-safe position. If the main power is again confirmed after a two second test delay, valve 3 is returned to its pr-fail-safe position, and, finally, the entire system resets and recharges for the next automatic sequence. However, if during any delay period during which power is tested, the PLC detects a loss of power, the last valve which has been returned to its pre-fail-safe position is again moved to its fail-safe position and this procedure is continued so that continued absence of power will return each drive valve to its fail-safe position after a predetermined delay to confirm the continued absence of power in the system. This will continue until all of the valves are back in their fail-safe conditions, and the valves will remain in those conditions until the main power has been established for a preset period, such as five seconds. If, on the other hand, the select switch 22 is in the manual position, as soon as the main power is returned and the UPS is taken off line and starts to recharge; the system remains stabilized in a fail-safe position. No automatic return to service until a a human operator resets the system to automatic.

It will be appreciated, therefore, that the controller 10c constantly monitors the main power for proper system voltage and operating conditions. Brown outs under 100 volts will trip the logic circuit to bring the UPS on line and return normal 115 volt power to the system. Transient outages under five seconds will bring the UPS system on line, but will not trip the fail-safe system.

The unit 10c, therefore, does more than existing fail-safe valve controllers. It combines logic circuitry with the functions of mechanical actuators. Unlike prior art actuators, the internal UPS 32 provides a power source in the event of a total power loss. The unit functions in its entirety in the absence of outside power. As indicated, the UPS is provided with sufficient storage capacity to store sufficient electrical energy to actuate electro-mechanical or electro-hydraulic components from one operational state or condition to another. The logic controller or PLC is sequentially programmed to perform specific steps in the carefully prescribed order. The system is constantly testing the line and is able to detect transient power dips that should be ignored. Where a transient or momentary power loss would trip any other fail-safe system, the device or unit 10c "thinks" and follows a logical mechanical path to secure the system. When the power is returned, the unit can automatically return the system to full operation. It automatically resets, recharges, and is ready for the next emergency. More importantly, with existing systems, if power loss is only transient, the reactive closing then immediate reopening of the same valves often causes serious damage to the pumps and/or pipeline because of the induced hydraulic shocks and water hammer. The unit 10c, however, does not close valves as quickly and suddenly as a standard hydraulic, spring or pneumatic fail-safe system would, with its resulting hydraulic shockwaves and water hammers. The valve is closed at its own normal rate of speed, which eliminates the potential for damaging the pumps and/or pipelines or associated components.

Depending on the needs of the application, the unit 10c is fully customizable, and can be adjusted for time before tripped to fail-safe; be instantly changed from fail-safe open to fail-safe closed position; be operated from either a local or remote location; interface with any VFD or other motor controller; be custom engineered to fit any specific industry or application; provide independent control of a number electro-mechanical or electro-hydraulic actuators; and interface with any electric, electro-hydraulic, pneumatic actuator or centralized system.

The unit 10c is simple and cost effective compared to any other way of controlling valve actuators because it fail-safes existing equipment, namely actuator-valve pairs 1, 2 and 3 in FIG. 7, protecting a company's substantial investment in these components.

Typical applications for the logic controller 10c is to provide for an emergency shutdown capability for numerous external conditions, including for example, the malfunction of hazardous chemical lines, for remote locations, which is being stressed by many fire departments. During a fire, in or adjacent to, a chemically sensitive building or plant, it is necessary to be able to automatically stop the flow of product with or without the presence of main power. The controller 10c can shut down equipment, pumps and processes and close tank discharge valves automatically without any external power. This is a critical feature in terms of fire suppression, since most fires almost immediately eliminate available power to close valves and isolate storage tanks. The logic controller 10c can also be emergency operated from any types of fire alarm systems, smoke detectors, or automatic sprinkler systems. This feature provides a completely automatic fire control function.

The logic controller 10c can also be used to monitor many types of chemical and process piping. Using a simple double-pressure switch or transducer, it can automatically shut down pumps and valves in the event of a pipe break (under pressure) or a clogged or blocked discharge line (over pressure). The logic circuit can determine under pressure, over pressure, or normal conditions and react accordingly. It can then transmit an emergency signal to any remote location.

The controller can also be used in liquid chlorine injection processes. In the event of power loss, pipe break or fire, it will automatically react by halting chlorine injection pumps and fail-safe closing storage tank discharge valves. It can then turn on automatic sprinkler systems or any other safety valves. External audio or visual alarms can be activated and fire department or main control rooms can be notified of the emergency condition. The logic controller 10c can also be used in controlling the energy dissipation of a massive hydraulic shockwave or water hammer in a long water transmission line, in a manner similar to that discussed in connection with FIGS. 4 and 5.

The controller can also be used to monitor several engine and turbine inputs. Typically, these inputs might be oil pressure and temperature, cooling water circulation and temperature, turbine inlet temperature, and/or fuel flow. When a critical monitored input is out of limits, the controller can "think" and shut down the input fuel flow or start a turbine trip sequence without supervision. The unit can fail-safe open or close critical valves to minimize damage. Then, the unit can notify local or remote stations with visual, audio or computer alarms.

Similarly, the controller 10c can be used in a petroleum refinery where there are hundreds of small actuated valves for petro-chemical distribution and mixing. In the event of a fire, pipe break or spill, the positive securing of these valves is critical. Since the controller of the present invention is not a reactionary device, but a logical controller, minor transient power outages would not disrupt system flows. But with its many monitoring abilities, it can react and automatically close valves and shut down equipment when necessary. This automatic response is all done without any external power or operator response because, in all of the aforementioned embodiments, an important element is the provision of a power supply, such as a UPC, which stores sufficient electrical energy to control the system and energize actuators and associated components to move from one condition or state to another.

The logic controller 10c, as suggested, can be used as a conversion device for converting non-fail-safe actuators to fail-safe ones, in existing systems. Examples of electric, electro-hydraulic and pneumatic actuators that can adapt to and be used in conjunction with the present invention include: "LimiTorque"; "RoTourque"; Hayward"; "Tri Tech"; "MOV"; "EMI"; "Raymond Control System"; "Westran Quaker City"; "Praco"; "Trident"; "Rodney Hunt"; "Hills McCanna"; "DeZurik"; "Mars Hydraulics"; "Airoyal"; and "Ward Leonard".

While the invention is described with reference to specific embodiments thereof and with respect to the incorporation therein of certain combinations of features, it is to be understood that the invention may be embodied in other forms wherein the PLC can be programmed for various responses to a large number of external conditions as aforementioned; many of which do not incorporate all of the features present in this specific embodiment of this invention which has been described. For this reason, the invention is to be taken and limited only as defined by the claims that follow.

We claim:

1. Fault management apparatus for a system that includes at least one electro-mechanical or electro-hydraulic component having two operational states to be controlled as a function of at least one external condition, the apparatus comprising actuator means electrically connected to the component to be controlled for control signals to selectively actuate or de-actuate the component; standby electrical power supply memos for storing sufficient electrical energy to energize the component to change the state of the component from one operational state to the other operational state; sensing means for detecting the presence or absence of at least one external condition; and programmable logic means responsive to said sensing means and selectively programmable for applying, energy stored in said standby electrical power supply means to said actuator means and to the component at least as a function of the duration of the external condition the apparatus having the capability of at least being programmed to minimize undesired actuations of a component as a result of insignificant interruptions in an external condition.

2. An apparatus as defined in claim 1, wherein the component is a discharge pump, and wherein said actuator means comprises a pump controller.

3. An apparatus as defined in claim 1, wherein the component is a valve, and wherein said actuator means comprises a valve actuator.

4. An apparatus as defined in claim 1, wherein said standby electrical power supply means comprises an uninterruptible power supply (UPS).

5. An apparatus as defined in claim 1, wherein said sensing means comprises a manual switch for manually establishing said at least one external condition.

6. An apparatus as defined in claim 1, wherein said sensing means comprises means for sensing main power failure.

7. An apparatus as defined in claim 1, wherein said sensing means comprises means for sensing a predetermined emergency condition.

8. An apparatus as defined in claim 1, wherein said programmable logic means comprises relay logic.

9. An apparatus as defined in claim 1, wherein said programmable logic means comprises a programmable logic circuit (PLC).

10. An apparatus as defined in claim 1, further comprising indicator means for providing an indication as to the status of component.

11. An apparatus as defined in claim 1, wherein the apparatus is used in a process facility having at least one pump for normally pumping a liquid, and a valve for enabling or inhibiting the flow of the liquid through a conduit of the process facility, and further comprising a pump controller for controlling the pump upon the sensing of said external condition contemporaneously when the valve is being controlled by said actuator means.

12. An apparatus as defined in claim 1, wherein a plurality of components are to be managed; and a plurality of sets of actuator means, standby electrical power supply means, sensing means and programmable logic means are provided each set associated with another of the components.

13. An apparatus as defined in claim 1, wherein a plurality of components are to be managed; and a plurality of actuator means are provided all cooperating with a single logic means.

14. An apparatus as defined in claim 1, wherein said programmable logic means is programmed to provide a sequenced shutdown mechanism of the system upon the occurrence of an external condition.

15. An apparatus as defined in claim 14, wherein said programmable logic means is programmed to provide a sequenced power-up mechanism of the system upon the elimination of the external condition.

16. Apparatus for conversion of a non-fail-safe controller to a fail-safe controller for an electro-mechanical component, wherein the controller has an electrical interface for actuating and de-actuating the controller, the conversion apparatus comprising standby electrical power supply means for storing sufficient electrical energy to energize the component to change the state of the electro-mechanical component from one operational state to the other operational state; sensing means for detecting the presence or absence of at least one external condition; and programmable logic means responsive to said sensing means for applying energy stored in said standby electrical power supply means to said actuator means and the electro-mechanical component, the state of the component being changed from one state to the other upon the occurrence of said at least one external condition.

17. Method of managing fault on a system that includes at least one electro-mechanical or electro-hydraulic component having two operational states to be controlled as a function of at least one external condition, the method comprising the steps of storing sufficient electrical energy to energize the component to change the state of the component from one operational state to the other operational state; detecting the presence or absence of at least one external condition; and applying said energy stored to the component to change its state upon the occurrence of said at least one external condition.

18. Method as defined in claim 17, wherein said detecting step comprises detecting main power applied to the system.

19. Method as defined in claim 17, wherein said detecting step comprises detecting an emergency condition in the system.

20. Method as defined in claim 17, wherein the system is exposed to transient external conditions, and further comprising the step of delaying application of said stored energy for a predetermined period of time to avoid changes in states of a component solely as a result of said transient external conditions.

* * * * *